United States Patent
Wood

[19]

[11] Patent Number: 6,047,989

[45] Date of Patent: Apr. 11, 2000

[54] TRANSPORT TRAILER WITH COMBINE HEAD SUPPORT AND HOLD DOWN UNITS

[75] Inventor: James E. Wood, Fort Recovery, Ohio

[73] Assignee: J. & M. Manufacturing Co., Inc., Fort Recovery, Ohio

[21] Appl. No.: 09/028,741

[22] Filed: Feb. 24, 1998

[51] Int. Cl.[7] .................................................. B62D 63/06
[52] U.S. Cl. ........................ 280/789; 410/2; 410/44; 410/103
[58] Field of Search ........................... 280/789, DIG. 15, 280/146; 296/3; 410/2, 44, 45, 156, 80, 72, 77, 103

[56] References Cited

U.S. PATENT DOCUMENTS

| | | | |
|---|---|---|---|
| 4,382,736 | 5/1983 | Thomas | 410/103 |
| 4,884,928 | 12/1989 | Nachtigall et al. | 410/103 |
| 5,333,904 | 8/1994 | Kuhns | 280/789 |
| 5,374,082 | 12/1994 | Smith | 280/789 |
| 5,529,447 | 6/1996 | Bruns et al. | 410/2 |

*Primary Examiner*—Paul N. Dickson
*Assistant Examiner*—Lynda Jasmin
*Attorney, Agent, or Firm*—Jacox, Meckstroth & Jenkins

[57] ABSTRACT

A self-propelled grain combine head is transported on a wheel supported trailer having an elongated lower support bar on which is mounted a pair of slidable head support units each having a bracket supporting a repositionable support member. Each support member has peripherally spaced different support surfaces for receiving frame members of different combine heads, and each bracket and corresponding head support member have a plurality of sets of alignable holes for receiving a pair of removable cross pins. A pair of hold down units are also slidably mounted on the lower support bar, and each unit carries a manually actuated ratchet winch having a flexible hold down strap. Each strap is connected to a combine head by a hook which may also receive a claw-type hook and a cross pin.

13 Claims, 3 Drawing Sheets

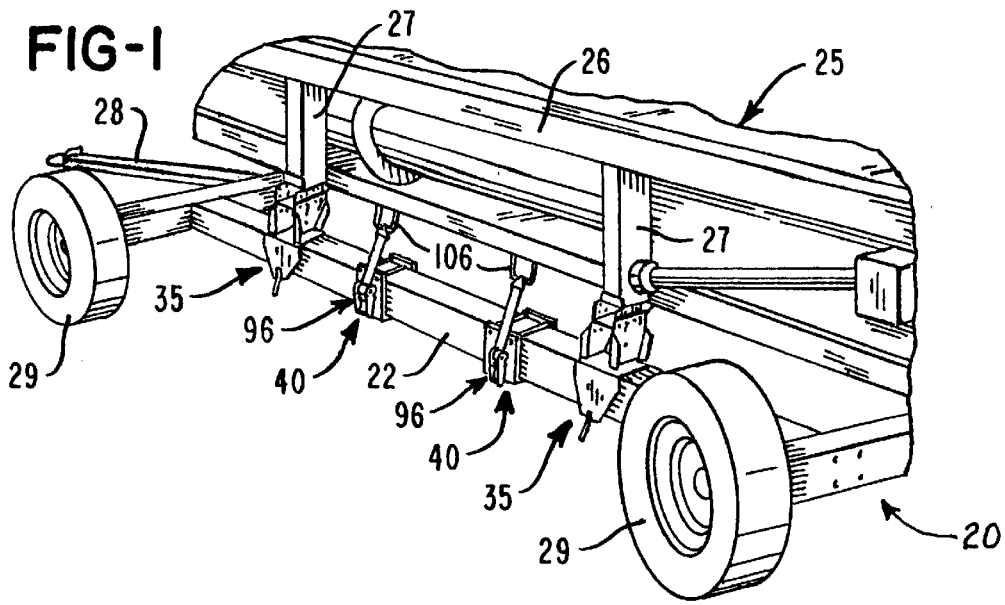
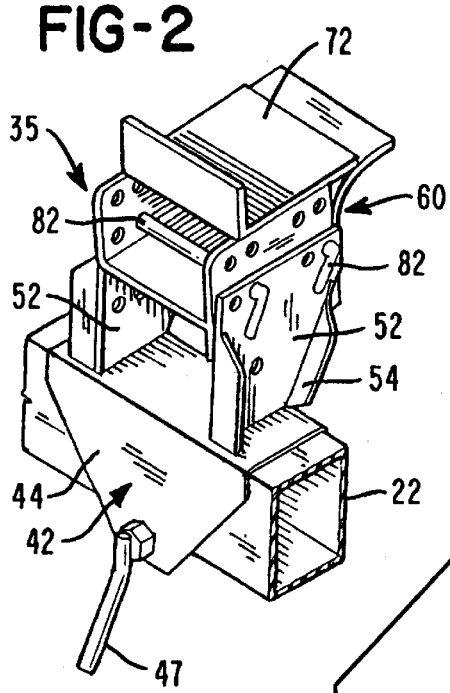
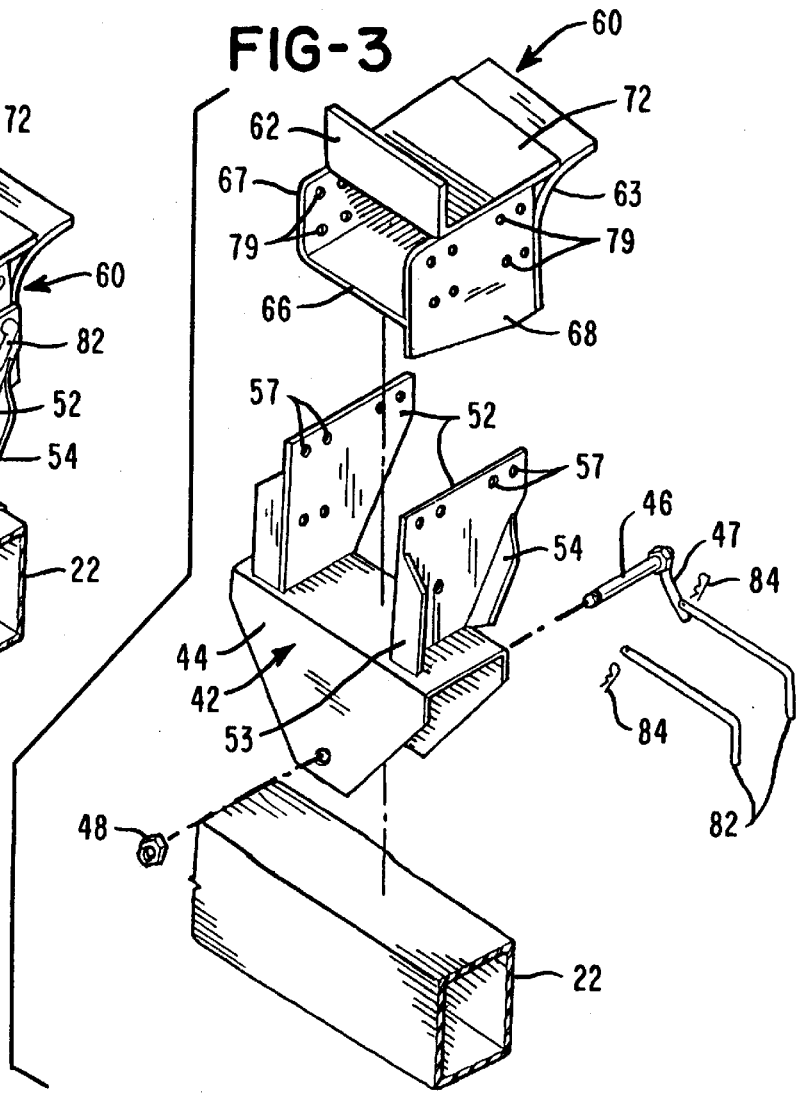

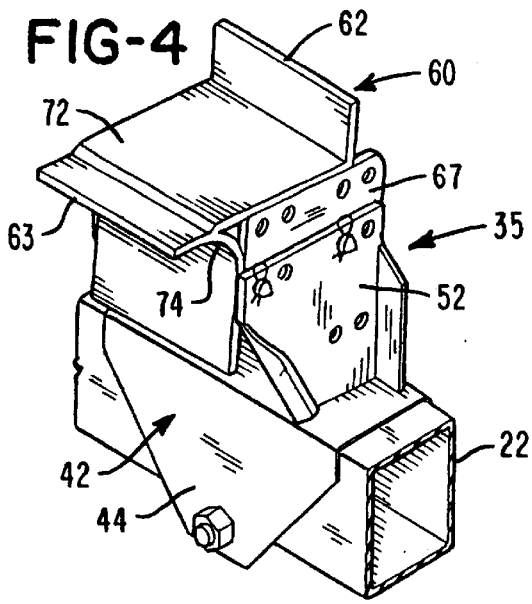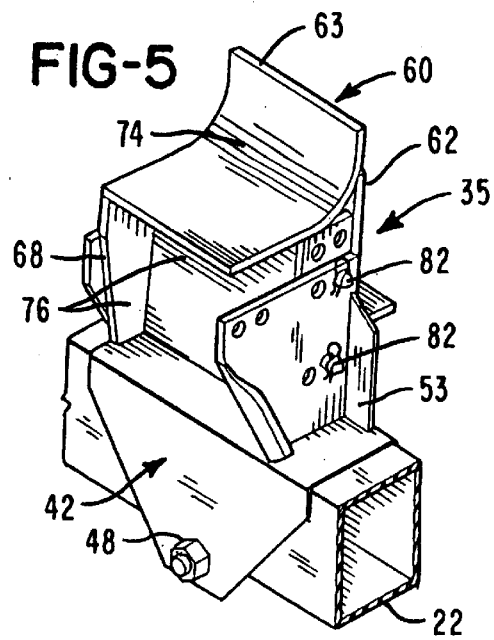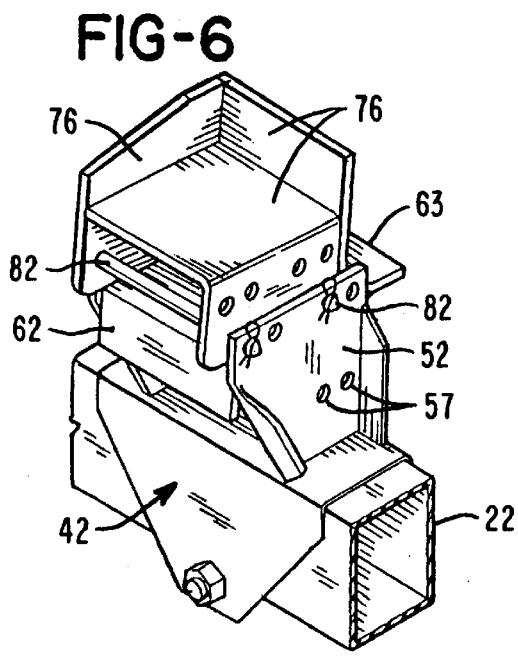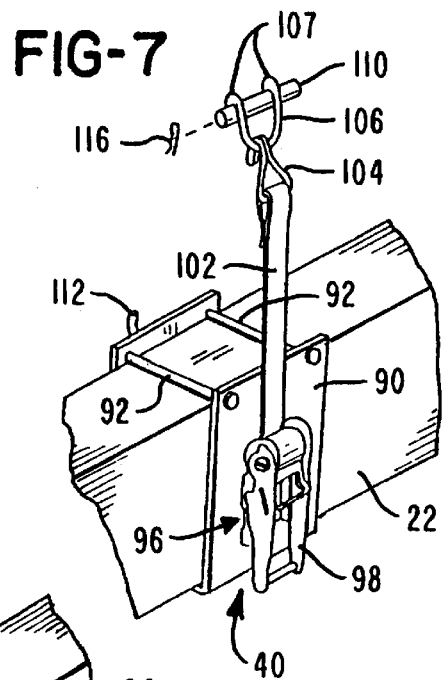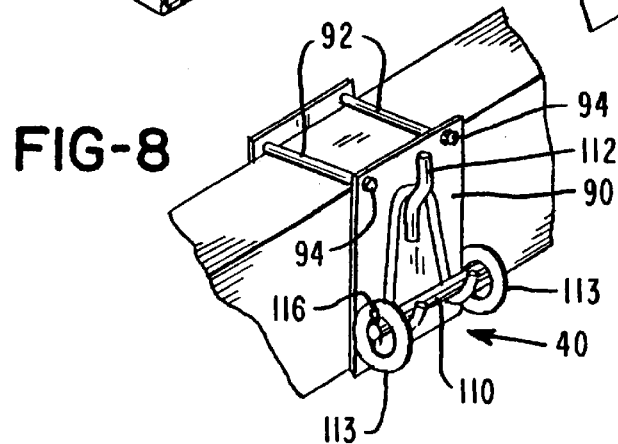

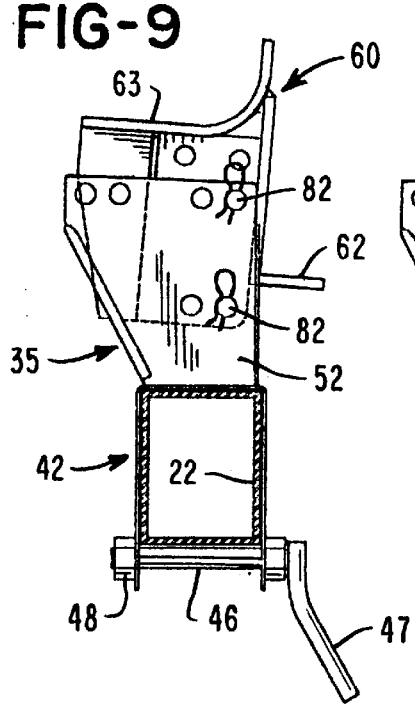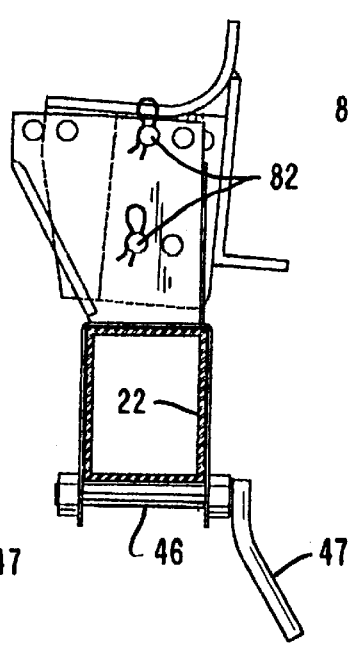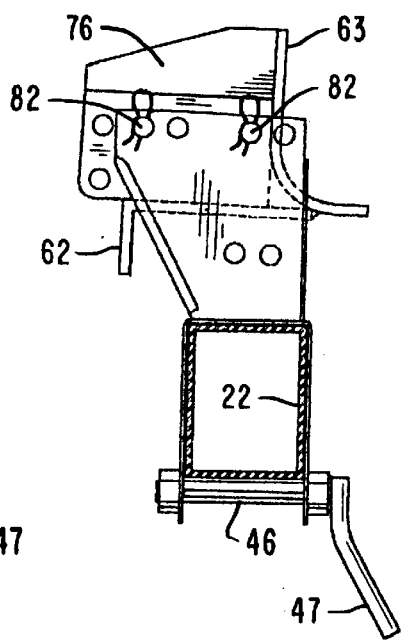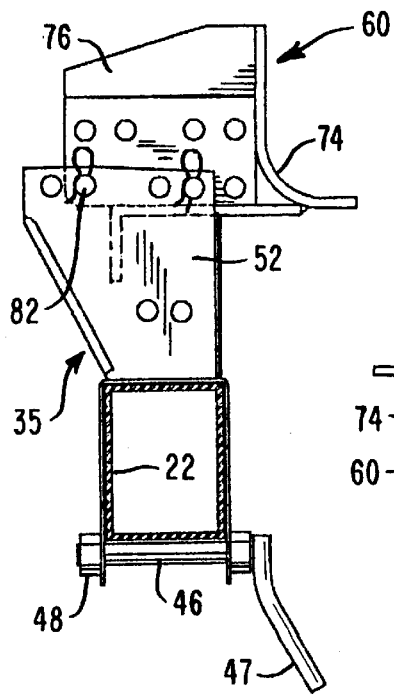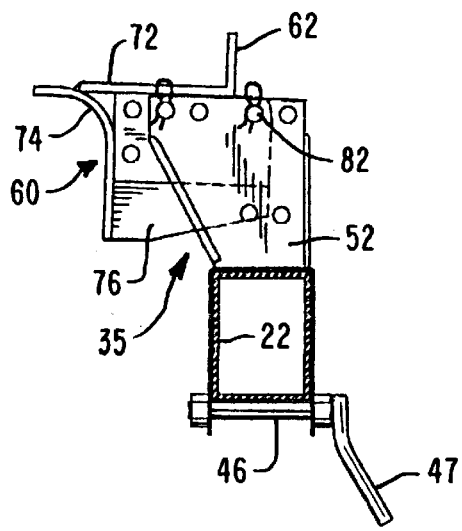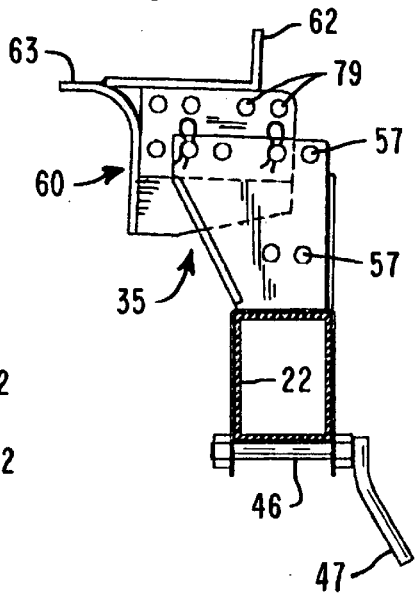

6,047,989

TRANSPORT TRAILER WITH COMBINE HEAD SUPPORT AND HOLD DOWN UNITS

BACKGROUND OF THE INVENTION

In the art of self-propelled combines which use different heads, for example, for combining grain and for picking and shelling corn, the substantial width of the head frequently requires that the head be separately transported in a longitudinal direction on a road transport trailer, for example, of the general type as disclosed in U.S. Pat. No. 5,333,904. In order for the transport trailer to accommodate and support the different heads of different manufacturers of self-propelled combines, the trailer preferably has upper and lower elongated support bars which extend longitudinally on opposite sides of the trailer. A pair of support brackets are slidably mounted on each of the bars, and each bracket is adjustable. As disclosed in the above mentioned patent, each of the support brackets on the lower bar has one L-shaped support surface for receiving a frame member on one type of combine head. A second support member pivots from an inactive position to an active position on top of the first support member and has a curved surface for receiving a cylindrical frame member of another combine head.

In such a transport trailer of the general type disclosed in the above mentioned patent, it is desirable to have support members with several conveniently selectable different head engaging surfaces for accommodating a variety of different combine heads of different manufacturers and for accommodating the different heads of each manufacturer. Such features are especially desirable on transport trailers used by farm machinery distributors and dealers who frequently transport a wide variety of combine heads. It is also desirable for the transport trailer to provide a head hold down unit which may be conveniently used and also adapted for accommodating a wide variety of combine heads.

SUMMARY OF THE INVENTION

The present invention is directed to an improved wheel supported transport trailer for a grain harvester or combine head and which provides all of the desirable features mentioned above and which is especially easy to adjust and use for supporting and securing a wide variety of combine heads. In accordance with a preferred embodiment of the invention, a wheel supported transport trailer has a longitudinally extending lower rail or bar on one side of the trailer, and the bar supports a pair of longitudinally adjustable head support units and also a pair of head hold down units. Each of the head support units includes an inverted U-shaped bracket slidably mounted on the support bar, and each bracket includes a pair of longitudinally spaced plates which project upwardly to support a repositionable head support member having a series of peripherally spaced different head engaging surfaces. A plurality of sets of horizontally alignable holes are formed within each head support member and its supporting bracket, and a pair of removable cross pins extends through two sets of aligned holes and provide for selectively positioning each of the support surfaces at the top of the head support member. The sets of holes also provide for adjusting each support surface vertically as well as laterally for accommodating a variety of different combine heads.

Each of the head hold down units also include a bracket which is longitudinally slidable on the lower support bar and which carries a manually actuated ratchet-type winch having a flexible strap. The strap is connected to a hook element for engaging some types of combine heads or for engaging a U-shaped claw hook and cross pin assembly for engaging other types of heads.

Other features and advantages of the invention will be apparent from the following description, the accompanying drawings and the appended claims.

BRIEF DESCRIPTION OF THE DRAWINGS

FIG. 1 is a fragmentary perspective view of a wheel supported header transport trailer having a longitudinally extending bar supporting a pair of combine head support units constructed in accordance with the invention and also a pair of head hold down units constructed in accordance with the invention;

FIG. 2 is a perspective view of an assembled head support unit as shown in FIG. 1;

FIG. 3 is an exploded perspective view of the combine head support unit shown in FIG. 2;

FIGS. 4–7 are perspective views of the head support unit shown in FIGS. 2 and 3 and in different positions for accommodating a variety of different combine heads;

FIGS. 7 and 8 are perspective views one of the head hold down units shown in FIG. 1; and FIGS. 9–14 are side elevational views of the head support unit shown in FIGS. 2–6 and illustrating the different head support surfaces in some of the different selected positions relative to the trailer lower support bar for accommodating a variety of different combine heads.

DESCRIPTION OF THE PREFERRED EMBODIMENTS

A wheel supported transport trailer 20 includes a lower frame member or bar 22 which has a rectangular cross section and is preferably constructed of steel. The trailer 20 is used for transporting a self-propelled combine head 25 having a frame 26 with longitudinally spaced vertical legs or posts 27. It is understood that the particular construction of the combine head 25 forms no part of the present invention and that the construction of the head 25 depends upon the particular farm machinery manufacturer. As shown in FIG. 1, the wheel support trailer 20 includes a tow bar 28 for towing the trailer and for steering the front set of wheels 29.

In accordance with the present invention, a pair of fabricated steel head support units 35 are mounted on the lower bar 22 for longitudinal adjustment, and a pair of head hold down or retainer units 40 are also mounted on the bar 22 for independent longitudinal movement between the support units 35. As shown in FIGS. 2 and 3, each of the head support units 35 includes a bracket 42 having an inverted U-shaped channel portion 44 for slidably receiving the bar 22. A clamping bolt 46, having a handle 47, extends through aligned holes within the bottom of the channel portion 44 below the bar 22 and receives a nut 48 for securing or locking the bracket 42 to the bar 22 at a selected longitudinal position. The bracket 42 of each support unit 35 also includes a pair of longitudinally spaced and upwardly projecting parallel plate members 52 each of which has a set of right angle flanges 53 and 54 and is welded to the top wall of the channel portion 44. Each of the plate members 52 is provided with a set of six holes 57 which are horizontally aligned within the plates 52.

A combine head support member 60 is constructed of fabricated steel and is positioned between the plates 52 of the bracket 42 of each support unit 35. Each support member 60 includes an L-shaped plate 62, a curved plate 63, an L-shaped plate 66 with an end flange 67, and a flat end plate 68. The plates 62, 63 and 66 have substantially the same width and are welded together with the plate 68 to provide the support member 60 with three peripherally spaced surfaces which include an L-shaped surface 72 (FIG. 4), a curved surface 74 (FIG. 5) and corner forming surfaces 76 (FIG. 6). The flange 67 of the plate 66 and the opposing portion of the plate 68 are provided with aligned sets of eight holes 79 which are spaced to align selectively with the holes 57 within the plate 52.

A pair of L-shaped cross pins 82 extend through corresponding sets of aligned holes 57 within the brackets 42 and the holes 79 within the support member 60 for positioning the support member 60 in fourteen different positions, six of which are illustrated, for example, in FIGS. 9–14. After the cross pins 82 are inserted into corresponding sets of aligned holes, snap-type wire retaining keys 84 are extended through holes within the end portions of the pins 82 for retaining the pins 82 within the holes, as shown in FIGS. 4–6. If desired, the pins 82 may be formed as one U-shaped pin.

FIGS. 9 and 10 illustrate two positions of the support member 60 when the curved surface 74 is located at the top of the support member. The sets of holes 57 and 79 also provide for two additional positions of the support member 60 while the curve surfaced 74 is located at the top. By retracting the pins 82, the head member 60 may be relocated or repositioned to locate the L-shaped surface 72 at the top of the support member, and two different such positions of the surface 72 are shown in FIGS. 13 and 14. However, the aligned sets of holes 57 and 79 also provide for locating the support member 60 at four additional positions while the L-shaped surface 72 is located at the top of the support member. FIGS. 11 and 12 illustrate two different positions of the support member 60 while the corner surfaces 76 are located at the top of the support member. The support member 60 may also be located in two additional positions (not shown) while the corner surfaces are on top, by extending the cross pins 82 in different sets of aligned holes 57 and 79.

Referring to FIGS. 7 and 8, each of the hold down units 40 includes a steel U-shaped bracket 90 which is slidable mounted on the bar 22 between the support units 35, and a pair of bolts 92 extend above the bar 22 through aligned holes within the top portions of the bracket 90 and receive lock nuts 94. The lock nuts 94 are tightened to a point which permit the bracket 90 to slide freely on the bar 22. A ratchet type winch 96 is secured to one side wall of each bracket 90 and includes an actuating lever 98 which is oscillated to extend and retract a flexible member or braided strap 102 onto a drum which is rotated by movement of the lever 98. The winch 96 is commercially available and includes a wire hook 104 attached to the outer end portion of the flexible strap 102.

Each hold down unit 40 is also provided with a claw-type hook 106 having U-shaped end portions 107 for receiving a cross pin 110 which preferably has a diameter of one inch and a length of six inches. When the claw hook 106 and pin 110 are not in use, they are stored on the opposite side of the channel-like bracket 90 (FIG. 8) by means of an Z-shaped stud 112 and a pair of washers or ears 113 which are all welded to or lanced from the bracket 90 for receiving the hook 106 and the cross pin 110. A pair of spring-like wire keys 116 retain the pin 110 on the hook 106 in both the stored position and in the use position (FIG. 1).

After a combine head 25 is positioned on the trailer 20, the support units 35 are positioned longitudinally on the bar 22 according to the desired location for supporting the adjacent side of the head 25. For example, as shown in FIG. 1, the support units 35 are positioned under the legs or posts 27, and the support members 60 are positioned, preferably with the corner surfaces 76 on top for receiving the bottom end portions of the posts 27. The hold down units 40 are then shifted longitudinally on the bar 22 until they are directly under a frame member having retaining loops for receiving the hooks 104 or holes for receiving the cross pins 110 connected to claw hooks 106. When each of the winches 96 is actuated to tighten the corresponding strap 102; the bracket 90 firmly grips the bar 22 to prevent any longitudinal movement of the hold unit 40 on the bar 22.

As mentioned above, by retracting the pins 82, each of the support members 60 may be repositioned to present each of the surfaces 72, 74 and 76 at the top of the support member. In addition, each of the support members may be repositioned or adjusted laterally and/or vertically, as shown in FIGS. 9–14, according to the particular framework of the combine head 25. When it is desired to remove the combine head 25 from the trailer 20, the winches 96 are actuated to release the tension in the straps 102 so that the hooks 104 or 106 may be disconnected from the frame of the combine head which may then be lifted from the trailer.

From the drawings and the above description, it is apparent that the construction of each of the support units 35 and of each of the hold down units 40 provides desirable features and advantages. As a primary advantage, each of the support units 35 may be conveniently and quickly adjusted to accommodate the support of a wide variety of combine heads. In addition, each of the hold down units 40 may be conveniently and quickly positioned and actuated to secure the combine head 25 on the trailer 20. This eliminates the need for surrounding the combine head 25 and the lower rail or bar 22 with a tension strap or cord or chain.

While the forms of trailer transport apparatus herein described constitute preferred embodiments of the invention, it is to be understood that the invention is not limited to these precise forms of apparatus, and that changes may be made therein without departing from the scope and spirit of the invention as defined in the appended claims.

What is claimed is:

1. In a wheel supported transport trailer for a grain combine head and including an elongated horizontal support bar, a support unit for supporting combine heads of different manufacturers, comprising a bracket for receiving said support bar, means for releasably connecting said bracket to said support bar, said bracket including a set of generally parallel spaced and upwardly projecting bracket members, a repositionable support member disposed between said bracket members and including peripherally spaced separate support surfaces adapted for engaging combine heads produced by the different manufacturers, said support member and said bracket members having a plurality of sets of alignable holes arranged in a predetermined pattern, and a set of cross pins extending through corresponding said sets of said holes within said support member and said bracket members and providing for repositioning said support member between said bracket members to locate each of said support surfaces at the top of said support member.

2. A transport trailer as defined in claim 1 wherein said separate support surfaces on said support member comprise an L-shape surface, a curved surface and corner forming surfaces.

3. A transport trailer as defined in claim 1 wherein said support member comprises parallel spaced generally vertical plates having a plurality of sets of horizontally aligned said holes.

4. A transport trailer as defined in claim 1 wherein said bracket comprises an inverted U-shaped bracket slidably mounted on said bar, and said bracket members comprise parallel spaced vertical bracket plates secured to said bracket and having a plurality of sets of horizontally aligned said holes.

5. A transport trailer as defined in claim 4 wherein each of said bracket plates has side flanges providing for a channel-shaped horizontal cross-sectional configuration.

6. A transport trailer as defined in claim 1 and including at least one hold down unit comprising a second bracket slidably mounted on said bar, and a manually actuated mechanism mounted on said second bracket and having a flexible element adapted to be connected to a combine head.

7. A transport trailer as defined in claim 1 and including at least one hold down unit comprising a ratchet actuated winch having an extendable and retractable flexible element extending from a rotatable drum, and a second bracket slidably mounted on said support bar and supporting said winch for longitudinal movement to a selected position.

8. A transport trailer as defined in claim 7 wherein said flexible element is attached to a hook member, a U-shape claw hook receiving said hook member and having hook-shaped end portions, and a cross pin extending through said end portions.

9. In a wheel supported transport trailer for a grain combine head and including an elongated horizontal support bar, a support unit for supporting combine heads of different manufacturers, comprising a bracket for slidably receiving said support bar, said bracket including a set of generally parallel spaced and upwardly projecting bracket members, a repositionable support member disposed between said bracket members and including at least three peripherally spaced separate support surfaces adapted for engaging combine heads produced by different manufacturers, said support surfaces on said support member including an L-shape surface, a curved surface and corner forming surfaces, said support member and said bracket members having a plurality of sets of alignable holes arranged in a predetermined pattern, a set of cross pins extending through corresponding said sets of said holes within said support member and said bracket members and providing for repositioning said support member between said bracket members to locate each of said support surfaces at the top of said support member, a hold down unit slidably receiving said support bar, and said hold down unit including an extendable and retractable flexible element having means for engaging the combine head.

10. A transport trailer as defined in claim 9 wherein said bracket comprises an inverted U-shaped bracket slidably mounted on said bar, and said bracket members comprise parallel spaced vertical bracket plates secured to said inverted U-shaped bracket and having a plurality of sets of horizontally aligned said holes.

11. A transport trailer as defined in claim 9 wherein said hold down unit comprises a ratchet actuated winch having said extendable and retractable flexible element extending from a rotatable drum, and a U-shaped bracket slidably mounted on said support bar and supporting said winch for longitudinal movement to a selected position.

12. A transport trailer as defined in claim 11 wherein said flexible element comprises a strap attached to a hook member, a U-shape claw hook receiving said hook member and having hook-shaped end portions, a cross pin extending through said end portions, and said U-shaped bracket includes storage means for said claw hook and said cross pin.

13. In a wheel supported transport trailer for a grain combine head and including an elongated horizontal support bar, a support for the combine head and including a support member for engaging the combine head, a hold down unit comprising a bracket slidably mounted on said support bar, a winch supported by said bracket and having an extendable and retractable flexible element, a hook member secured to said flexible element for connecting said flexible element to the combine head, a U-shape claw hook releasably connected to said hook member and having a pair of parallel spaced hook-shaped end portions, a cross pin extending between and through said end portions, and a support on said bracket for storing said claw hook and said cross pin when not in use.

\* \* \* \* \*